United States Patent
Morawietz et al.

(10) Patent No.: US 12,522,435 B2
(45) Date of Patent: Jan. 13, 2026

(54) METHOD FOR OPERATING A BLOCK STORAGE ARRANGEMENT AND BLOCK ARRANGEMENT

(71) Applicant: Jungheinrich Aktiengesellschaft, Hamburg (DE)

(72) Inventors: Timm Morawietz, Tholey-Überroth (DE); Carlos De Almeida, Frankfurt (DE); Michael Reising, Offenbach (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 530 days.

(21) Appl. No.: 18/115,338

(22) Filed: Feb. 28, 2023

(65) Prior Publication Data

US 2023/0278787 A1 Sep. 7, 2023

(30) Foreign Application Priority Data

Mar. 3, 2022 (EP) .................................... 22160000

(51) Int. Cl.
*B65G 1/04* (2006.01)

(52) U.S. Cl.
CPC ......... *B65G 1/0471* (2013.01); *B65G 1/0492* (2013.01); *B65G 2207/40* (2013.01)

(58) Field of Classification Search
CPC . B65G 1/0471; B65G 1/0492; B65G 2207/40
See application file for complete search history.

(56) References Cited

U.S. PATENT DOCUMENTS

| 9,927,797 | B2* | 3/2018 | Stubbs | ............. G05B 19/41895 |
| 10,503,143 | B1* | 12/2019 | Polic | .................... G05B 19/406 |
| 11,623,342 | B2* | 4/2023 | Coady | .................... B25J 9/1676 |
| | | | | 700/79 |

(Continued)

FOREIGN PATENT DOCUMENTS

| EP | 3 812 307 | 4/2021 |
| WO | 2016/033233 | 3/2016 |
| WO | 2021/115864 | 6/2021 |

OTHER PUBLICATIONS

Europe Search Report/Office Action conducted in counterpart Europe Appln. No. 22160000.0 (Sep. 14, 2022).

*Primary Examiner* — Kyle O Logan
(74) *Attorney, Agent, or Firm* — GREENBLUM & BERNSTEIN, P.L.C.

(57) ABSTRACT

Method for operating a block storage arrangement and a block storage arrangement that has multiple container stacking chambers, a loading chamber arranged below the container stacking chambers, and at least one loading vehicle, which includes a travel drive and a lifting drive, that is movable in the loading chamber. The method includes positioning, via the travel drive, the at least one loading vehicle below a preselected container stacking chamber; via the lifting drive, one of storing a container in the container stacking chamber from below or removing a container downwardly from the container stacking chamber; and prior to a person gaining access to at least the loading chamber, placing the block storage arrangement into a secure state by inactivating at least the lifting drive of the loading vehicle.

18 Claims, 1 Drawing Sheet

(56) References Cited

U.S. PATENT DOCUMENTS

| | | | |
|---|---|---|---|
| 2011/0050878 A1* | 3/2011 | Wells | H04N 7/181 |
| | | | 348/86 |
| 2016/0062345 A1* | 3/2016 | Stubbs | G05B 19/41895 |
| | | | 701/2 |
| 2017/0057088 A1* | 3/2017 | Watanabe | B25J 9/1674 |
| 2018/0307187 A1* | 10/2018 | Scholz | G05B 19/048 |
| 2019/0176323 A1* | 6/2019 | Coady | B65G 1/0421 |
| 2019/0340909 A1* | 11/2019 | Nguyen | B25J 9/1676 |
| 2020/0391944 A1* | 12/2020 | Kakinuki | B65G 1/0471 |
| 2021/0053760 A1* | 2/2021 | Cavelius | B65G 1/1375 |
| 2021/0053777 A1* | 2/2021 | Harting | B65G 57/302 |
| 2021/0053778 A1* | 2/2021 | Morawietz | B65G 57/303 |
| 2021/0122569 A1* | 4/2021 | Cavelius | B65G 1/0485 |
| 2021/0167713 A1* | 6/2021 | Kaufleitner | B60L 3/0023 |
| 2021/0348718 A1* | 11/2021 | Brunner | F16P 3/147 |
| 2022/0144546 A1* | 5/2022 | Tendo | G05D 1/02 |
| 2023/0202037 A1* | 6/2023 | Andreoni | B25J 9/1676 |
| | | | 700/245 |

* cited by examiner

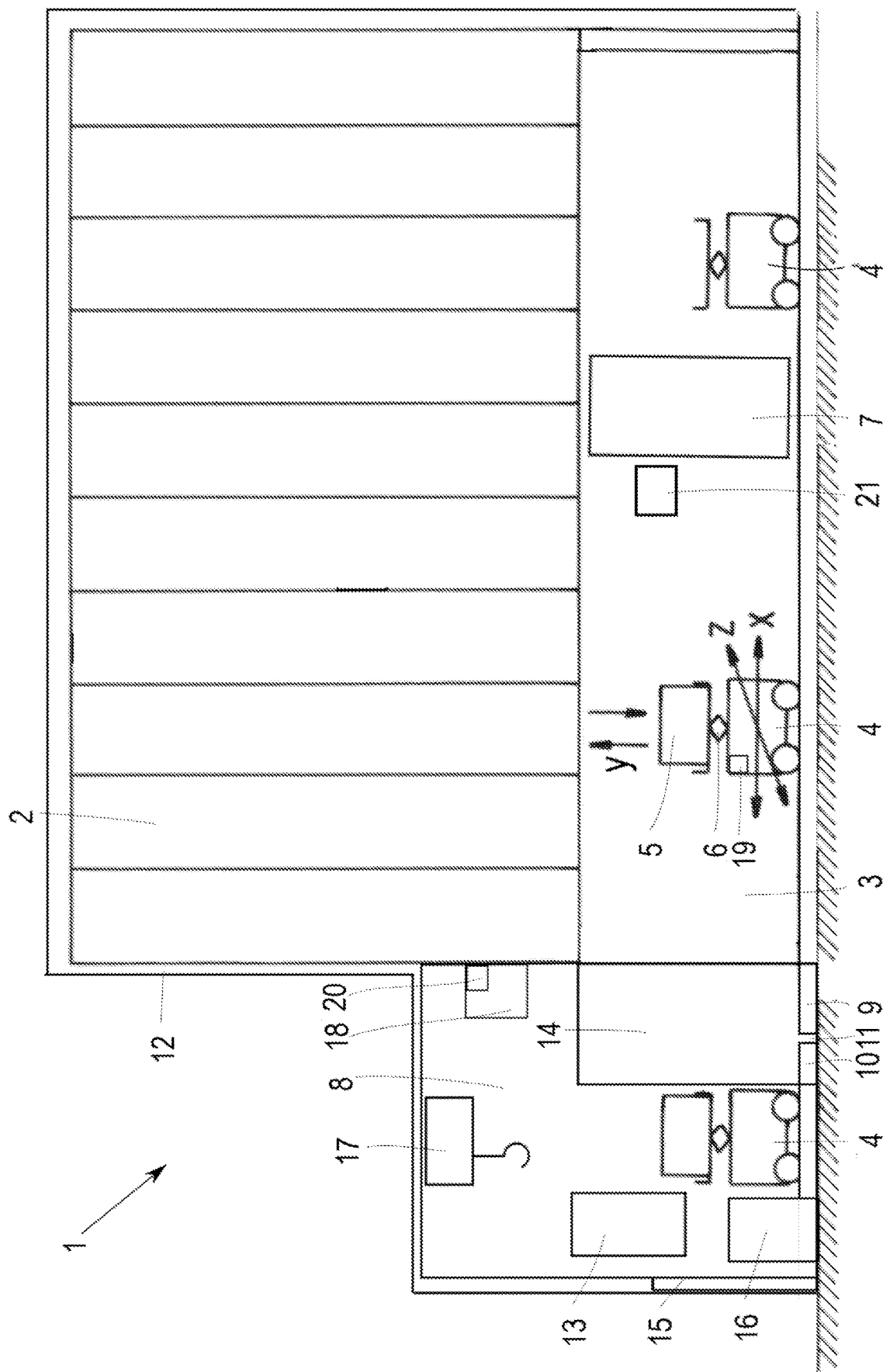

METHOD FOR OPERATING A BLOCK STORAGE ARRANGEMENT AND BLOCK ARRANGEMENT

CROSS-REFERENCE TO RELATED APPLICATION

This application claims priority under 35 U.S.C. § 119 (a) to Europe Application No. 22 16 0000.0 filed Mar. 3, 2022, the disclosure of which is expressly incorporated by reference herein in its entirety.

BACKGROUND

1. Field of the Invention

Embodiments are directed to a block storage arrangement that has multiple container stacking chambers, a loading chamber arranged below the container stacking chambers, a control device and at least one loading vehicle that can be moved in the loading chamber. The loading vehicle has a travel drive, by which the loading vehicle can be positioned below a container stacking chamber preselected by the control device, and a lifting drive, by which a container can be stored in the container stacking chamber from below or can be removed from the container stacking chamber downwards.

Furthermore, embodiments are directed to a block storage arrangement having multiple container stacking chambers, a loading chamber that is arranged below the container stacking chambers and through which the container stacking chambers are accessible, a control device and at least one loading vehicle. The loading vehicle has a travel drive, by which the loading vehicle can be positioned below a container stacking chamber preselected by the control device, and a lifting drive, by which a container can be stored in the container stacking chamber from below or can be removed downwards from the container stacking chamber.

2. Discussion of Background Information

A block storage arrangement is characterized by the fact that it is possible to make relatively good use of the available space in order to accommodate a large number of goods to be stored. Thereby, the corresponding goods are arranged in containers. The containers are in turn stacked, specifically in the container stacking chambers, which may be arranged side by side. The storage of a container in a container stacking chamber takes place from below through the loading chamber, specifically with the aid of the loading vehicle. The removal of a container from a container stacking chamber is also performed downwards with the aid of the loading vehicle, which can lower the container from the container stacking chamber into the loading chamber and then move it out of the loading chamber.

Such a block storage arrangement normally operates largely without interference. However, if a malfunction should occur, a maintenance person must have access to the block storage arrangement in order to correct the malfunction. The malfunction can be, for example, that a container has become jammed or tilted. In this case, the container must be correctly aligned again manually.

However, in the block storage arrangement, more specifically in the loading chamber, there is the at least one loading vehicle, which is a source of danger for the maintenance person.

SUMMARY

Embodiments are directed to operating a block storage arrangement securely with low expense.

According to embodiments, a block storage arrangement of the type mentioned above can include placing the block storage arrangement in a secure state prior to access by a maintenance person by deactivating the lifting drive of the loading vehicle.

If the loading vehicle is inactivated, the lifting drive can no longer move. Thus, there is no risk of the maintenance person being trapped between a container or container contact surface and a frame or floor located between the loading chamber and the container stacking chambers when the lift actuator is operated. Thus, the risk posed by the loading vehicle is reduced quite considerably. By placing the block storage arrangement in a secure state prior to the access of the maintenance person, the block storage arrangement can be maintained in the secure state while the maintenance person is in the block storage arrangement.

It is advantageous if, when the loading vehicle is inactivated, the lifting drive of the loading vehicle is moved to a lowermost position in the direction of gravity and the lifting drive is then stopped. This also virtually eliminates any risk to the maintenance person that could result from a sinking lifting drive.

Preferably, the loading vehicle is inactivated at the position where it is located. This saves time. It is no longer necessary to wait until the loading vehicle has reached a predetermined position before it can be inactivated. On the contrary, inactivation can follow without any time delay.

Preferably, the travel drive of the loading vehicle is deactivated when the loading vehicle is inactivated. If the travel drive is deactivated, the loading vehicle can no longer move in the loading chamber and then practically no longer forms a source of danger for the maintenance person.

Preferably, the access of the maintenance person is prevented by a door that is closed, whereby an enable signal must be generated to open the door. Such enable signal is not generated until the block storage arrangement has been placed in a secure state.

Preferably, to generate the enable signal, the maintenance person is required to send a request signal to the block storage arrangement, and the enable signal is not generated until a predetermined period of time after a request signal is generated, wherein the predetermined period of time is longer than the time required for the loading vehicle to inactivate and for the loading vehicle to detect the request signal. With this embodiment, the maintenance person or another person working with the maintenance person must generate the request signal. The block storage arrangement then "knows" that access by a maintenance person is desired. However, the control device does not yet generate the enable signal to open the door, but waits for the predetermined period of time, such that the loading vehicle is actually in an inactivated state before opening the door. Since the loading vehicle detects the request signal, it has the necessary information to initiate a sequence of steps to place it in the inactive state. Thus, the inactivation of the loading vehicle can take place autonomously inside the block storage arrangement. Intervention by the control device beyond detection of the request signal by the loading vehicle is not required.

Preferably, a signal is transmitted continuously from the control device to the loading vehicle, and the loading vehicle detects the request signal if it receives less than a predetermined number of signals in a predetermined period of time.

This makes it possible to transmit the signals wirelessly, for example via radio or via WLAN, even if it is not always possible in the block storage arrangement to ensure that the signals are always transmitted without interference. In a block storage arrangement, there is typically multiple supports that may provide shielding from wirelessly transmitted signals. Also, multiple loading vehicles may be moving in the loading chamber at the same time, which may then cause mutual shielding, such that not every signal reaches every loading vehicle. However, the failure of a single signal is not yet a sign for the loading vehicle that a request signal is present. Rather, the loading vehicle detects a request signal only if it receives less than a predetermined number of signals in a predetermined period of time. For example, you can transmit 1000 signals in a period of one second. If the loading vehicle receives less than 500 signals per second, then it detects the request state. However, such numbers are to be understood as an example.

Preferably, the signal is a control signal transmitted from the control device to the loading vehicle in addition to at least one control signal. The control signal can then be detected separately by the loading vehicle, resulting in increased security.

According to embodiments, a block storage arrangement of the type mentioned at the beginning, in which the control device is connected to a request device with which a maintenance person can indicate a request for access, and the control device, after actuation of the request device and prior to the access of the maintenance person, places the block storage arrangement into a secure state, with which the lifting drive of the loading vehicle is inactivated. An inactivated loading vehicle is then no longer a source of danger for the maintenance person. Since inactivation occurs before the maintenance person enters the block storage arrangement, states that are secure or unsecure are defined. When the block storage arrangement is in a secure state, the maintenance person can enter the block storage arrangement. Entry may be permitted, for example, by the block storage arrangement having a door through which the maintenance person may enter the block storage arrangement, wherein the door is closed and not opened until the loading vehicle is inactivated.

Preferably, the control device continuously sends signals to the loading vehicle and the loading vehicle detects a request signal if it does not receive a predetermined number of signals in a predetermined period of time, wherein the loading vehicle switches to an inactive state after detecting the request signal. With this embodiment, the signals can be transmitted wirelessly, i.e., by radio or by WLAN, from the control device to the loading vehicle. However, in a block storage arrangement, there is a risk that not every signal will reach the loading vehicle because elements of the block storage arrangement, such as stands or the like, may shade the signals. An additional problem is that there may be multiple loading vehicles in the loading chamber, which may move relative to one another and thus from time to time cause a signal from the control device not to reach the respective loading vehicle. To mitigate this problem, the control device continuously sends out signals. Only when the loading vehicle receives less than a predetermined number of signals in a predetermined period of time does the loading vehicle detect the request signal. For example, in uninterrupted operation, if the control device sends 1000 signals per second to the loading vehicle, the loading vehicle will detect a request signal if it detects no more than 500 signals per second. Thus, the absence of one or a few signals does not lead to the detection of a request signal and thus to the inactivation of the loading vehicle. For example, the signals may be pulse sequences that represent a specific code for each loading vehicle. The control device can be designed in such a way that the signals form control signals and the control device additionally emits control signals that control the loading vehicle in the activated state of the respective loading vehicle, i.e., give the loading vehicle a position to which it should travel and an instruction as to whether it is to store or collect a container.

Preferably, the loading vehicle has a first timer that controls a first time interval after which the loading vehicle switches to the inactive state, and the control device has a second timer that controls a second time interval after which the control device generates the enable signal, wherein the second time interval is greater than the first time interval. Both time intervals start with the generation or reception of the request signal. The first time interval can still comprise a time during which the loading vehicle performs certain operations. For example, if the loading vehicle has lifted a container to remove it from a container stacking chamber, the loading vehicle must hold open a holding device that holds the remaining containers of a container stack located in the container stacking chamber until the lowermost container has been removed. Only then can the loading vehicle switch to the inactive state. However, such a time fraction can be determined beforehand and can be taken into account when determining the first time interval.

Preferably, the loading vehicle inactivates itself after detecting the request signal. Thus, after the loading vehicle has detected the request signal, a signal connection with the control device is no longer required. Rather, the loading vehicle can automatically take all steps necessary to inactivate it.

It is advantageous that a maintenance chamber is arranged outside the loading chamber and the loading vehicle moves into the maintenance chamber after receiving the request signal. Thus, the loading vehicle does not have to be stopped immediately after receiving the request signal. Rather, it can still finish a task it is performing and then move to a maintenance chamber separate from the loading chamber, such that the loading chamber is free of loading vehicles and the maintenance person has access to the entire loading chamber.

Embodiments are directed to a method for operating a block storage arrangement that has multiple container stacking chambers, a loading chamber arranged below the container stacking chambers, and at least one loading vehicle, which comprises a travel drive and a lifting drive, that is movable in the loading chamber. The method includes positioning, via the travel drive, the at least one loading vehicle below a preselected container stacking chamber; via the lifting drive, one of storing a container in the container stacking chambers from below or removing a container downwardly from the container stacking chambers; and prior to a person gaining access at least the loading chamber, placing the block storage arrangement into a secure state by inactivating at least the lifting drive of the loading vehicle.

According to embodiments, in inactivating the loading vehicle, the lifting drive of the loading vehicle can be moved to a lowermost position in the direction of gravity and then stopped.

In accordance with embodiments, the loading vehicle may be inactivated at a position in the block storage arrangement where it is located. Further, when the lifting drive is inactivated, the travel drive of the loading vehicle can also deactivated.

In other embodiments, the person is prevented from gaining access to the at least loading chamber by a door that is closed until an enable signal is generated to open the door. The method can further include the person sending a request signal to the block storage arrangement to generate the enable signal, and delaying generation of the enable signal until a predetermined period of time elapses after the request signal is sent. The predetermined period of time may be longer than a combined period of time for inactivating the lifting drive after the loading vehicle receives the request signal and for the loading vehicle to receive the request signal after the request signal is sent. Status signals may be transmitted continuously to the loading vehicle, and the loading vehicle can detect the request signal when it receives less than a predetermined number of status signals in a predetermined period of time. The block storage arrangement may further have a control device configured to send at least one control signal to the at least one loading vehicle in order to control operation of the at least one loading vehicle, and status signals may be also transmitted continuously from the control device to the loading vehicle, and the loading vehicle can detect the request signal when it receives less than a predetermined number of status signals in a predetermined period of time. The signal can be a control signal transmitted from the control device to the loading vehicle in addition to at least one control signal.

In accordance with other embodiments, the block storage arrangement may further have a control device configured to select the preselected container stacking chamber and to send at least one control signal to the at least one control vehicle in order to control operation of the at least one loading vehicle.

In still other embodiments, the block storage arrangement may have a maintenance chamber adjacent the loading chamber, and the method may further include prior to a person gaining accessing the maintenance chamber, placing the block storage arrangement into the secure state by inactivating at least the lifting drive of the loading vehicle.

Embodiments are directed to a block storage arrangement that includes multiple container stacking chambers; a loading chamber that is arranged below the container stacking chambers and through which the container stacking chambers are accessible; at least one loading vehicle having a travel drive by which the loading vehicle can be positioned below a preselected container stacking chamber and a lifting drive by which a container is one of: stored in the container stacking chamber from below or removed downwardly from the container stacking chamber; and a request device with which a person requests to gain access to at least the loading chamber. After actuation of the request device and prior to the person gaining access to the at least loading chamber, the block storage arrangement is placed into a secure state, in which the lifting drive of the loading vehicle is inactivated.

According to embodiments, the block storage arrangement can also include a control device that is configured to select the preselected container stacking chamber and that is connected to the request device. After after actuation of the request device and prior to the person gaining access to the at least loading chamber, the control device can place the block storage arrangement into the secure state, in which the lifting drive of the loading vehicle is inactivated. The control device may continuously sends status signals to the loading vehicle and the loading vehicle can detect a request signal when it does not receive a predetermined number of status signals in a predetermined period of time, and the loading vehicle can switch to an inactive state after detecting the request signal. The loading vehicle may have a first timer that controls a first time interval after which the loading vehicle switches to the inactive state, and the control device may have a second timer that controls a second time interval after which the control device generates the enable signal. The second time interval can be greater than the first time interval. Further, the loading vehicle can inactivate itself after detecting the request signal.

In other embodiments, a maintenance chamber can be arranged outside the loading chamber and, after actuation of the request device and prior to the person gaining access to the at least loading chamber, the loading vehicle can move into the maintenance chamber.

In accordance with still yet other embodiments, the block storage arrangement can have a maintenance chamber adjacent the loading chamber, and prior to the person accessing the maintenance chamber, the block storage arrangement may be placed into the secure state by inactivating at least the lifting drive of the loading vehicle.

Other exemplary embodiments and advantages of the present invention may be ascertained by reviewing the present disclosure and the accompanying drawing.

BRIEF DESCRIPTION OF THE DRAWINGS

The invention is described below with reference to a preferred exemplary embodiment in conjunction with the drawing. In the FIGURE:

The FIG. is a highly schematized illustration of a block storage arrangement.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A block storage arrangement 1 has multiple container stacking chambers (or spaces) 2 arranged side by side in the form of a row (in the X direction). Multiple rows of such container stacking chambers 2 may be arranged one behind the other (in the illustration of the FIG., perpendicular to the drawing plane in the Z direction). Each container stacking chamber 2 can receive one container stack. A loading chamber (or space) 3 is arranged below the container stacking chambers 2. A loading vehicle 4 can be moved in the loading chamber 3. The loading vehicle 4 is used to store a container 5 in a container stacking chamber 2 or to remove a container 5 from a container stacking chamber. For this purpose, the loading vehicle 4 has a lifting drive 6 with which the container can be moved in the direction of the arrows Y, i.e., in the direction of gravity.

The loading chamber 3 is accessible to a maintenance person through a door 7, wherein the door 7 is locked and such locking can only be released in a manner that can be described further below.

The loading vehicle 4 can be moved in the direction X, which corresponds to the longitudinal extension of the row of container stacking chambers 2. It can also be moved in the direction Z, which is directed perpendicular to it.

A maintenance chamber 8 is arranged adjacent to the loading chamber 3. The loading vehicle 4 can be driven into the maintenance chamber 8 via a rail arrangement, which has first rails 9 that also extend into the loading chamber 3, and second rails 10 that are located only in the maintenance chamber 8. Here, the rails 9, 10 are shown with a gap 11 between them. However, it is also possible for rails 9 and 10 to merge seamlessly.

The block storage arrangement 1 has an enclosure 12 that surrounds both the container stacking chambers 2 and the loading chamber 3, along with the maintenance chamber 8. The enclosure 12 can be used to maintain an atmosphere with a reduced oxygen content in at least the container stacking chambers 2 and the loading chamber 3 so that the hazard of fire is minimized.

The enclosure 12 has a window 13 in the maintenance chamber 8. Through the window 13, a maintenance person can look into the maintenance chamber 8 in order to at least visually inspect a loading vehicle 4 located there. The atmosphere of the maintenance compartment 8, on the one hand, and the container stacking compartments 2 and the loading compartment 3, on the other hand, can be kept separate by a sluice arrangement 14, which is occasionally advantageous if maintenance work is to be carried out in maintenance compartment 8 by an operator.

The maintenance compartment 8 itself is accessible through a door 15, which, like the door 7 in the loading compartment 3, can only be opened under certain conditions. The maintenance chamber 8 can further have a loading station 16 for the loading vehicle 4, which loading station has an accumulator or an electrically rechargeable battery in order to perform the movements in the loading chamber. Furthermore, a lifting device 17, which can be designed as a trolley or a crane, for example, is arranged in the maintenance compartment 8.

The block storage arrangement 1 has a control device 18 that controls the loading vehicle 4 or the loading vehicles 4. The control device 18 is in wireless communication with the loading vehicles 4. If a maintenance person wants to enter the loading chamber 3, for example because repair or maintenance is required, this is not easily possible, because there is a certain danger from the vehicles located in the loading chamber 3.

To minimize this hazard, the operator must initially generate a request signal that is transmitted to the control device 18. The request signal can be generated, for example, by a switch or button attached to the exterior of the enclosure 12 (not shown). However, the request signal can also be transmitted wirelessly to the control device 18 via a remote control unit or via a cell phone. As soon as the control device 18 has received a corresponding request signal, it informs the loading vehicles 4 of this.

The transmission of the request signal to the loading vehicles 4 can be effected, for example, by the control device 18 continuously transmitting a signal to each loading vehicle 4 and the loading vehicle 4 detecting the request signal if it receives less than a predetermined number of signals in a predetermined time period.

The signals may have different shapes. For example, one may proceed such that the control device 18 sends control signals to the loading vehicles 4, instructing the loading vehicle 4 to perform certain actions or activities. An example of this is that the loading vehicle 4 moves under a certain container stacking chamber 2 and, in such position, lifts a container 5 until it has been inserted into the container stacking chamber 2 and is held there by a holding device not shown in more detail. In another approach, the loading vehicle 4 is in turn driven under a container stacking chamber 2 and the lifting device 6 is operated to lift a container located in the container stacking chamber 2 until it is released from a holding device. The loading vehicle 4 can then release the holding device and lower the container 5, such that it is completely located in the loading chamber 3 and can be moved there.

In addition, the control device 18 can also send a control signal. In this case, the loading vehicle 4 would evaluate the control signal separately. If the loading vehicle 4 determines from the control signal that a request signal has been generated, it can initiate a securing sequence described below.

The loading vehicle 4 can initiate this sequence even if it receives less than a predetermined number of signals in a predetermined time. This applies both to the control signal mentioned above and to the control signals. For example, if the control device 18 sends 1000 signals per second to the loading vehicle 4, then the loading vehicle 4 assumes that a request signal has been generated if it receives less than 500 signals per second. This takes into account the fact that regions exist in the stacking arrangement where a wireless connection between the control device 18 and the loading vehicle 4 is not always ensured.

If the loading vehicle 4 detects that a request signal has been generated, it initiates the inactivation sequence mentioned above. However, this does not have to take place immediately after the request signal is detected, but can also involve the loading vehicle 4 completing an order once it has been started. The control device 18 "knows" which order it has given to the respective loading vehicle 4 and accordingly also "knows" which time period is required for this order.

After completion of this order (or earlier if necessary), the loading vehicle 4 inactivates the lifting drive 6. In particular, the loading vehicle 4 moves the lifting drive 6 to the lowermost position in the direction of gravity and then stops the lifting drive 6. This minimizes the risk of a maintenance person being crushed or otherwise injured in the Y direction by the lifting drive 6 or by a container 5 located on the lifting drive 6.

The time required for the loading vehicle to inactivate can vary from case to case. It depends, among other things, on whether or not the loading vehicle 4 still has to complete an order. However, this is known to the control device 18, which can then determine the time required for inactivation.

The loading vehicle 4 has a first timer 19 that controls a first time interval. After the first time interval, the loading vehicle 4 is controlled into the inactive state. The control device 18 has a second timer 20 that controls a second time interval. After the second time interval, the control device 18 generates the enable signal. The second time interval is greater than the first time interval.

A request device 21 is shown schematically adjacent to the door 7. The request device 21 is located on the outside of the enclosure 12, in any event outside the loading chamber 3. A corresponding request device 21 can also be provided adjacent to the door 15.

Furthermore, the loading vehicle 4 can deactivate its travel drive. This is expediently done only after the loading vehicle 4 has been moved to the maintenance region 8. If all loading vehicles 4 have been moved to the maintenance region 8, the loading chamber 3 is empty and can be easily entered by a maintenance person.

To enter, the control device 18 generates an enable signal that causes the door 7 and/or the door 15 to open. However, the enable signal is not generated immediately after a request signal is generated, but only a predetermined period of time later. Such predetermined period of time is longer than the time required by the loading vehicle to inactivate. A further requirement is that the loading vehicle detects the request signal, which the loading vehicle must in turn signal to the control device 18.

Only if these conditions are all met can the maintenance person enter the loading chamber 3 and carry out the necessary measures there.

The loading vehicle 4 inactivates itself after detecting the request signal 6, i.e., the steps required for inactivation are already stored in a control system (not shown) provided in the loading vehicle 4. Thus, the loading vehicle 4 only needs to detect the request signal to inactivate. No further signals that it would need to receive from the control device 18 are required for inactivation.

In embodiments, control device 18 can be implemented as microprocessor-based hardware, e.g., as a computer, microcontroller, digital signal processor (DSP), programmable logic controller (PLC), etc., on which corresponding control programs for implementing the respective function run. An embodiment as an integrated circuit, such as, for example, an application-specific integrated circuit (ASCI) or field programmable gate array (FPGA), is also conceivable. Control device 18 can be implemented digitally, e.g., as software on microprocessor-based hardware. Thus, control device 18 can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies, and/or analog instrumentation, e.g., analog electric/electronic circuits, analog computers, analog devices, etc. Further, the processing of the signals in control device 18 can be implemented by microprocessors or similar components, programmed using software (e.g., microcode) to perform various functions discussed herein and may optionally be driven by firmware and/or software. Alternatively, control device 18 may be implemented by dedicated hardware, or as a combination of dedicated hardware to perform some functions and a processor (e.g., one or more programmed microprocessors and associated circuitry) to perform other functions.

Moreover, at least one memory (not shown), e.g., a non-transitory computer readable medium or media, can be provided and accessible by control device 18 to store one or more sets of instructions to perform any of the methods or computer-based control functions disclosed herein, either alone or in combination with the other described devices. Control device 18 can also include at least one processor that can access the at least one memory to execute the one or more sets of instructions to perform any of the methods or computer-based functions discussed above. Moreover, the at least one memory can be part of the slave or can be remote from the slave, e.g., a remotely located server, memory, system, or communication network or in a cloud environment, and the at least one processor can also part of the slave or remote from the slave.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for operating a block storage arrangement that has multiple container stacking chambers, a loading chamber arranged below the container stacking chambers, and at least one loading vehicle, which comprises a travel drive and a lifting drive, that is movable in the loading chamber, the method comprising:
    positioning, via the travel drive, the at least one loading vehicle below a preselected container stacking chamber;
    via the lifting drive, one of storing a container in the container stacking chambers from below or removing a container downwardly from the container stacking chambers; and
    prior to a person gaining access at least the loading chamber, placing the block storage arrangement into a secure state by inactivating at least the lifting drive of the loading vehicle.

2. The method according to claim 1, wherein, in inactivating the loading vehicle, the lifting drive of the loading vehicle is moved to a lowermost position in the direction of gravity and then stopped.

3. The method according to claim 1, wherein the loading vehicle is inactivated at a position in the block storage arrangement where it is located.

4. The method according to claim 3, wherein, when the lifting drive is inactivated, the travel drive of the loading vehicle is also deactivated.

5. The method according to claim 1, the person is prevented from gaining access to the at least loading chamber by a door that is closed until an enable signal is generated to open the door.

6. The method according to claim 5, further comprising:
    the person sending a request signal to the block storage arrangement to generate the enable signal, and
    delaying generation of the enable signal until a predetermined period of time elapses after the request signal is sent,
    wherein the predetermined period of time is longer than a combined period of time for inactivating the lifting drive after the loading vehicle receives the request signal and for the loading vehicle to receive the request signal after the request signal is sent.

7. The method according to claim 6, wherein status signals are transmitted continuously to the loading vehicle, and the loading vehicle detects the request signal when it receives less than a predetermined number of status signals in a predetermined period of time.

8. The method according to claim 6, wherein the block storage arrangement further has a control device configured to send at least one control signal to the at least one loading vehicle in order to control operation of the-at least one loading vehicle, and
    wherein status signals are also transmitted continuously from the control device to the loading vehicle, and the loading vehicle detects the request signal when it receives less than a predetermined number of status signals in a predetermined period of time.

9. The method according to claim 8, wherein the signal is a control signal transmitted from the control device to the loading vehicle in addition to at least one control signal.

10. The method according to claim 1, wherein the block storage arrangement further has a control device configured to select the preselected container stacking chamber and to send at least one control signal to the at least one control vehicle in order to control operation of the-at least one loading vehicle.

11. The method according to claim 1, wherein the block storage arrangement has a maintenance chamber adjacent the loading chamber, and the method further comprises:
prior to a person gaining accessing the maintenance chamber, placing the block storage arrangement into the secure state by inactivating at least the lifting drive of the loading vehicle.

12. A block storage arrangement comprising:
multiple container stacking chambers;
a loading chamber that is arranged below the container stacking chambers and through which the container stacking chambers are accessible;
at least one loading vehicle having a travel drive by which the loading vehicle can be positioned below a preselected container stacking chamber and a lifting drive by which a container is one of: stored in the container stacking chamber from below or removed downwardly from the container stacking chamber; and
a request device with which a person requests to gain access to at least the loading chamber,
wherein, after actuation of the request device and prior to the person gaining access to the at least loading chamber, the block storage arrangement is placed into a secure state, in which the lifting drive of the loading vehicle is inactivated.

13. The block storage arrangement according to claim 12, further comprising a control device that is configured to select the preselected container stacking chamber and that is connected to the request device, wherein after actuation of the request device and prior to the person gaining access to the at least loading chamber, the control device places the block storage arrangement into the secure state, in which the lifting drive of the loading vehicle is inactivated.

14. The block storage arrangement according to claim 13, wherein the control device continuously sends status signals to the loading vehicle and the loading vehicle detects a request signal when it does not receive a predetermined number of status signals in a predetermined period of time, and
wherein the loading vehicle switches to an inactive state after detecting the request signal.

15. The block storage arrangement according to claim 14, wherein the loading vehicle has a first timer that controls a first time interval after which the loading vehicle switches to the inactive state, and the control device has a second timer that controls a second time interval after which the control device generates the enable signal, wherein the second time interval is greater than the first time interval.

16. The block storage arrangement according to claim 13, wherein the loading vehicle inactivates itself after detecting the request signal.

17. The block storage arrangement according to claim 12, wherein a maintenance chamber is arranged outside the loading chamber, and
wherein, after actuation of the request device and prior to the person gaining access to the at least loading chamber, the loading vehicle moves into the maintenance chamber.

18. The block storage arrangement according to claim 12, wherein the block storage arrangement has a maintenance chamber adjacent the loading chamber, and
wherein, prior to the person accessing the maintenance chamber, the block storage arrangement is placed into the secure state by inactivating at least the lifting drive of the loading vehicle.

\* \* \* \* \*